F. HARKINS.
COMBINED FISH HOOK, SINKER, AND LINE FASTENER.
APPLICATION FILED JUNE 17, 1909.
952,615.
Patented Mar. 22, 1910.
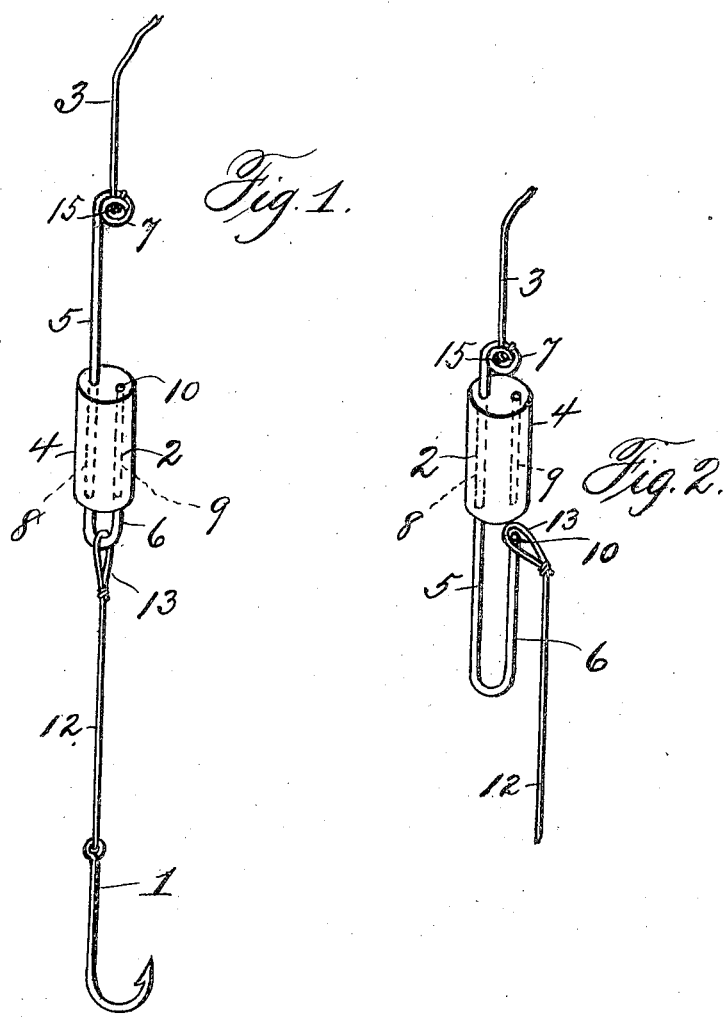
Witnesses
M. W. Darg
L. A. Price
Inventor
Fred Harkins,
By C. A. Brandenburg
Attorney

UNITED STATES PATENT OFFICE.

FRED HARKINS, OF PERU, KANSAS.

COMBINED FISH-HOOK, SINKER, AND LINE-FASTENER.

952,615.  Specification of Letters Patent.  Patented Mar. 22, 1910.

Application filed June 17, 1909. Serial No. 502,829.

*To all whom it may concern:*

Be it known that I, FRED HARKINS, citizen of the United States, residing at Peru, in the county of Chautauqua and State of Kansas, have invented certain new and useful Improvements in Combined Fish-Hooks, Sinkers, and Line-Fasteners, of which the following is a specification.

My invention relates to a combined sinker, fish-hook and line fastener, and among the objects in view is to provide an extremely simple, inexpensive and efficient device whereby the hook, sinker and line may be readily connected together and as readily detached from each other when desired.

A further object is to provide a device as described wherein the tying of the line to the sinker portion or member is avoided.

Other objects and advantages of the invention will be apparent from the following description when taken in connection with the accompanying drawing.

The invention consists in the novel construction, arrangement and combination of parts as hereinafter fully described, illustrated in the drawing and pointed out in the appended claims.

In the drawing, Figure 1 shows my improved device with the members thereof connected together. Fig. 2 is a perspective view of the sinker portion or member detached, and with the sliding lead or sinker proper in position to permit of the hook being attached to or detached from said sinker portion.

In the drawing, 1 indicates any ordinary or preferred form of fish-hook; 2 the sinker, and 3 the line.

The sinker portion or member of my device comprises the sinker proper 4 constructed of lead or some other weighty material and a hook-shaped bar or rod 5 forming a support for the sinker 4, which latter is slidably mounted on said support.

One end of the support 5 is bent to form a hook 6 while the opposite end is bent to form the coils 7 lying adjacent to but not quite in contact with each other. The support 5 is preferably constructed of copper or other material which will not rust.

The sinker 4 is provided with perforations 8 and 9 extending longitudinally therethrough. The sinker 4 is adapted to be mounted on its support 5 before the latter is bent to form the hook 6, the rod being passed through the perforation 8, and being then bent to form hook 6. The end 10 of the hook 6 is adapted to enter the perforation 9 of the sinker when the latter is slid into the position seen in Fig. 1.

While the sinker 4 is adapted to have a sliding movement on its support for the purpose of permitting the fish-hook being attached to or detached from the support 5, yet the perforation 8 should not be so large as to permit an accidental sliding movement of the sinker on its support when the device is in use, and I therefore so construct the parts that the rod 5 will rather snugly fit within the perforation 8.

12 indicates a short line which at one end is attached to the fish-hook and at the other end is formed into a loop 13 which is adapted to engage with the hook 6. After the loop 13 is engaged with the hook 6 the sinker 4 is slid on its support 5 until the end of hook 6 engages in perforation 9, whereby the line and hook 1 carried thereby are secured in position.

The line 3 is not tied to the sinker portion of the device but is adapted to have a quick-detachable connection therewith and for this purpose I form a knot 15 on the line and then pass the line through the narrow space between the coils 7, after which the line is given another turn between the coils and is thus held securely. When it is desired to detach the line this can be readily done by loosening the turns of the line and removing the latter from the space between the coils.

It will be understood that any desired number of sinkers and hooks may be attached to a single line by simply providing the latter with knots at intervals and engaging the line with the sinker supporting rods adjacent said knots in the manner above described.

While my device may be made and put upon the market with the various members connected together for use, yet it will be understood that the sinker member could be placed upon the market as a separate article of manufacture adapted for use with any ordinary line and fish-hook.

My device may be made in various sizes and of various materials suitable for the purpose.

What I claim is:—

1. A sinker for use as described, comprising a sinker proper 4, provided with two longitudinal perforations 8 and 9, and a support comprising a rod 5 bent at one end to form the hook-portion 6, said hook-portion being adapted to slide within said perforations and to frictionally engage within said perforations to hold the sinker 4 and its support in adjusted relation.

2. The combination with a sinker 4, provided with two longitudinal perforations 8 and 9, of a support for said sinker comprising a rod 5 bent at one end to form a hook-portion 6, said hook-portion being adapted to slide within the said perforations and to frictionally engage therein to hold the sinker and its support in adjusted relation, adjacently-arranged coils at the other end of the rod having an intervening space between said coils, and a line provided with a knot engaging within the space between the coils.

In testimony whereof I affix my signature in presence of two witnesses.

FRED HARKINS.

Witnesses:
 FRED MALLONY,
 L. C. JONES.